United States Patent [19]
Luhm

[11] Patent Number: 5,026,234
[45] Date of Patent: Jun. 25, 1991

[54] EXPANDABLE HEAD RIVET

[75] Inventor: Ralph R. Luhm, La Habra Heights, Calif.

[73] Assignee: Allfast Fastening Systems, Inc., City of Industry, Calif.

[21] Appl. No.: 498,100

[22] Filed: Mar. 23, 1990

[51] Int. Cl.⁵ ............................................. F16B 19/06
[52] U.S. Cl. ..................................... 411/507; 411/504; 29/524.1; 29/525.2
[58] Field of Search ................ 411/501, 504, 506, 507; 29/509, 522.1, 524.1, 525.2

[56] References Cited
U.S. PATENT DOCUMENTS

| | | | |
|---|---|---|---|
| 3,927,458 | 12/1975 | Speakman | 29/509 |
| 4,000,680 | 1/1977 | Briles | 411/507 |
| 4,051,592 | 10/1977 | Briles | 411/507 |
| 4,086,839 | 5/1978 | Briles | 411/507 |
| 4,159,666 | 7/1979 | Briles | 411/507 |

Primary Examiner—Neill R. Wilson
Attorney, Agent, or Firm—Blakely, Sokoloff, Taylor & Zafman

[57] ABSTRACT

An expandable head rivet for sealing applications and the like having improved inspectability after setting. The rivet has an axially extending shank, a first substantially cylindrical section and a second tapered section between the first section and the shank, all generally conforming to the hole and counterbores in the workpiece. The face of the rivet head has a raised central section having a substantially flat surface perpendicular to the axis of the rivet of a cross sectional area of at least a substantial percentage of the cross sectional area of the shank of the rivet. Upon setting of the rivet in the workpiece, the head end of the rivet is flattened and radially expanded to tightly engage the cylindrical counterbore. In the event that the cylindrical counterbore in the workpiece is longer than intended and longer than the corresponding section of the rivet head, the periphery of the endface of the set rivet will be disposed within the counterbore, thereby providing a visual indication that the counterbore was deeper or longer than expected, and also providing a visual indication of the possibility that the frustro-conical section of the rivet is not in tight engagement with the frustro-conical counterbore in the workpiece.

9 Claims, 3 Drawing Sheets

EXPANDABLE HEAD RIVET

BACKGROUND OF THE INVENTION

1. Field of the Invention

The present invention relates to the field of solid rivets.

2. Prior Art

Solid rivets of various kinds are of course very well known in the prior art. Of particular importance to the present invention are solid rivets of the type which are generally used for sealing applications such as, by way of example, may be used in the construction of aircraft wing fuel tanks and the like. In such applications, the rivets are intended not only to join two or more metallic sheets or members, but to also provide a seal for the rivet hole so that there will be no fuel leak around the rivet.

One such sealing rivet was developed for use in fuel sealing applications for the Boeing Aircraft model 727 wing structure. That rivet, identified as the BACR15DG rivet, was intended for use with a workpiece having a bore, a first substantially cylindrical counterbore and a second counterbore which is frustroconical and tapers forwardly between the first counterbore and the bore. The rivet itself had a head including an endface, a first cylindrical section located forwardly of the endface and a second tapered section forwardly of the first section between the first section and the rivet shank, the tapered section of the rivet substantially matching the taper of the frustro-conical counterbore of the workpiece. The entire endface of the head end of the rivet had a dome shape defined by a predetermined spherical radius of an amount dependent upon the size of the rivet. When the rivet was placed in position in the workpiece and set using a flat or substantially flat tool against the head end of the rivet, the dome shape of the rivet was flattened, substantially expanding the first section of the head into tight fuel-sealing engagement with the first counterbore in the workpiece.

The characteristics of the BACR15DG rivet in comparison to the counterbores in the workpiece before setting the rivet and the characteristics of the rivet after setting are best illustrated by considering the specific dimensions for a specific rivet of the BACR15DG series. By way of example, for the 3/16ths diameter shank rivet, the combined height of the conical section and the cylindrical section of the head range from 0.085 inches to 0.090 inches, with the corresponding dimensions for the hole specification ranging from 0.075 to 0.085 inches. Thus the periphery of the head of the rivet prior to setting would range from flush to 0.015 inches above the surface of the workpiece. The diameter of the first section of the 3/16ths rivet ranges from 0.2700 to 0.2725 inches, with the diameter of the corresponding counterbore in the workpiece ranging from 0.269 to 0.274 inches. Thus the head of the 3/16ths rivet can range from having a 0.002 inch radial clearance to approximately a 0.0018 inch radial interference with the workpiece before setting the rivet. As set, the specification for the unshaven head height for the 3/16ths inch BACR15DG rivet was 0.002 to 0.010 inches. In aerodynamic applications, it is generally required that the head height of a set rivet be in the range of 0.002 inches to 0.005 inches, the upper limit being determined by aerodynamic considerations and the lower limit being determined as assuring that the face of the setting tool "bottomed" on the head of the rivet, not on the workpiece.

Given these dimensions and tolerances, it is therefore apparent that statistically most of the 3/16th BACR15DG rivets were probably either slip fit or a lose fit in the counterbore in the workpiece prior to setting. Also, the dimensions of the heads of many of the set rivets would satisfy the head protrusion limits for aerodynamic applications, though clearly many others would require shaving after setting to meet such requirements.

A very similar rivet is disclosed in U.S. Pat. No. 4,000,680 entitled "Expanding Head Riveting Method and System". In that patent a domed head rivet is disclosed wherein the spherical section of the dome extends radially outward to a position short of the periphery of the first or cylindrical section of the head, curving into the otherwise flat endface of the head just outboard of the shank diameter. Also, the cylindrical section of the head is of a diameter less than but about the same as the diameter of the first counterbore to always provide clearance therebetween prior to setting. Subsequent patents to the same inventor, including U.S. Pat. Nos. 4,051,592, 4,086,839 and 4,156,666, related to the foregoing patent, disclose a dome headed rivet having what is referred to as a "ring dome" rather than a central dome, the ring dome being aligned with the outer diameter of the rivet shank. Rivets of this latter type have enjoyed substantial commercial success and are commonly used in fuel sealing aircraft applications wherein the workpiece has a cylindrical counterbore followed by the second frustro-conical counterbore joining the cylindrical counterbore with the bore through the workpiece.

The cylindrical head of the ring domed rivets expands radially on setting of the rivet to tightly engage the cylindrical counterbore in the workpiece when the counterbore is of proper depth, with the head of the set rivet generally being within the limits for aerodynamic usage without shaving of the head. At the same time the conical section of the rivet is generally in firm engagement with the frustro-conical tapered section of the hole in the workpiece, giving the desired strength and fatigue resistance for the set rivet. However sometimes the first counterbore (and thus the tapered section) of the hole in the workpiece is drilled too deeply. In such cases when a ring domed rivet is installed in such a deep counterbore, the periphery of the head remains substantially flush with the top of the workpiece and the head is flattened to at least somewhat radially expand the head so that the resulting installation has substantially the same appearance as a dimensionally correct and properly installed ring domed rivet in a dimensionally correct counterbored hole in the workpiece.

However in the case of the rivet set in the deep counterbore, the rivet becomes forced upward off of the conical portion of the counterbore, leaving a small gap between the tapered portion of the counterbore and the tapered section of the rivet head. This small gap allows the parts to move relative to each other under repetitive stress and vibration, resulting in a loosening of the head and the development of a fuel leak therearound. Accordingly, with these prior art rivets the only way to assure a proper joint is to first assure that the counterbored holes in the workpiece are within specification tolerances to start with by appropriate inspection thereof. The inability to inspect for this condition after the setting of the rivet is a substantial disadvantage however, as there is no opportunity to detect a lack of inspection of the holes or alternatively, an improper inspection thereof, after the ring dome rivets have been set. Accordingly, one of the primary objects of the present invention is to provide an expanding head rivet for fuel sealing and similar applications which can be inspected after the setting of the rivet so as to reveal an excessively deep counterbore as opposed to a proper counterbore, and for that matter to also reveal a shallow counterbore, all in a rivet which when properly installed in a proper counterbore will not require shaving in aerodynamic applications. The same will also occur with the center domed rivets of U.S. Pat. No. 4,000,680, as the dome is almost entirely within the shank diameter.

In addition to the foregoing prior art, also relevant for background purposes are U.S. Pat. Nos. 3,526,032, 3,747,467, 3,927,458, and 4,004,484. Also relevant are the following foreign patents: Russian Patent No. 516,848, German Patent No. 707,103, Russian Patent No. 409,016 and Russian Patent No. 517,709.

BRIEF SUMMARY OF THE INVENTION

An expandable head rivet for sealing applications and the like having improved inspectability after setting. The rivet has an axially extending shank, a first substantially cylindrical section and a second tapered section between the first section and the shank, all generally conforming to the hole and counterbores in the workpiece. The face of the rivet head has a raised central section having a substantially flat surface perpendicular to the axis of the rivet of a cross sectional area of at least a substantial percentage of the cross sectional area of the shank of the rivet. Upon setting of the rivet in the workpiece, the head end of the rivet is flattened and radially expanded to tightly engage the cylindrical counterbore. In the event that the cylindrical counterbore in the workpiece is longer than intended and longer than the corresponding section of the rivet head, the periphery of the endface of the set rivet will be disposed within the counterbore, thereby providing a visual indication that the counterbore was deeper or longer than expected, and also providing a visual indication of the possibility that the frustro-conical section of the rivet is not in tight engagement with the frustro-conical counterbore in the workpiece.

DETAILED DESCRIPTION OF THE INVENTION

Figure 1:
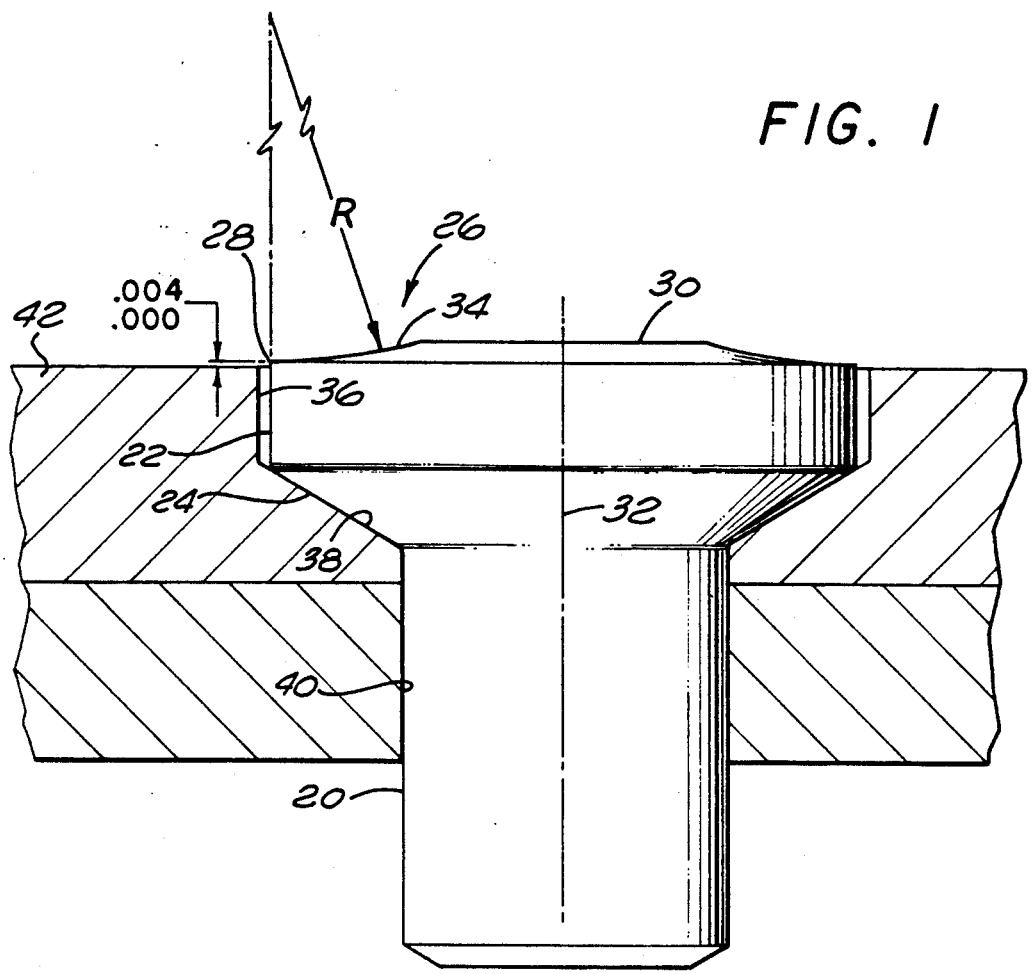
FIG. 1 is a partial cross section of a rivet and associated hole in a workpiece in accordance with a preferred embodiment of the present invention.

First referring to FIG. 1, the preferred embodiment of the present invention in the unset state and positioned within a proper counterbore in a workpiece may be seen. In the description to follow, the major elements of the rivet shall be referred to as the rivet shank 20, a first generally cylindrical section 22 and a second frustro-conical section 24 joining the first section 22 and the shank 20 of the rivet. The head endface of the rivet, generally indicated by the numeral 26, extends to a position above the periphery 28 of the first section 22 of the rivet. The top endface 26 is defined primarily by two surface regions, namely a substantially flat region 30 centered on the axis 32 of the rivet and located in a plane perpendicular thereto, and an annular region 34 therearound tapering from the central raised area 30 to the periphery 28 of the head endface, in the preferred embodiment not a linear taper.

In general herein, references to the rivet head generally are references to the first section 22 and the material defining the top endface, though may include the second section 24, depending upon the nature and context of the reference. The hole in the workpiece into which the rivet is placed for setting will be referred to generally herein as the hole or the counterbored hole, generally being comprised of three sections, namely a through bore into which shank 20 fits, a first substantially cylindrical counterbore 36 and a second frustro-conical counterbore region 38 joining the first counterbore 36 with the bore 40 through the workpiece. In general, references herein simply to the counterbore normally will refer to the combination of the first counterbore 36 and the second counterbore 38. By way of example, the desired or specification counterbore is a counterbore wherein the depth of the first counterbore 36 is within a predetermined dimensional range, the position of the frustro-conical counterbore 38 of course depending upon the actual length of the first counterbore 36. A deep counterbore, on the other hand, generally indicates that the length or depth of the first counterbore 36 is greater than the desired dimensional limits, with the frustro-conical counterbore 38 similarly being positioned deeper into the workpiece, specifically the upper member 42 of the workpiece, than desired or allowed by specification. In general the angle of frustro-conical section 24 of the rivet generally matches the angle of the second counterbore 38 of the hole in the workpiece.

In general, it is desired to have the rivet slip into the hole in the workpiece and the head of the rivet into the counterbored portion thereof without being forced. Accordingly, the diameter of the first section 22 of the rivet head should have an outer diameter which is less than but about the same as the diameter of the first counterbore 36. Normally this will provide a radial gap between the first section 22 and the wall of the first counterbore 36 ranging from essentially 0 to something on the order of 0.002 inches, depending on such factors as the rivet size and of course the specific design choices. The length of the first section 22 of the rivet head should be no less than the maximum depth of the first counterbore 36 for a proper counterbored hole in the workpiece. Thus whatever the maximum allowed depth is for the first counterbore 36 as per the specification therefor, the minimum length of the first section 22 should not be less than that maximum depth. Thus in the limit, the periphery 28 of the head endface 26 of the rivet may range from initially being flush with the surface of the workpiece to being somewhat thereabove, typically having an upper limit on the order of 0.004 inches for a 3/16ths inch diameter rivet. These numbers of course are representative only, though indicative of suitable dimensions and tolerances for the rivet and hole dimensions.

The flat raised central section 30 of the rivet head should have an area of at least a substantial percentage of the cross sectional area of the shank of the rivet for reasons to be hereinafter described in greater detail. The surface 34 of the head endface connecting the periphery of the central raised area 30 with the periphery 28 of the first section of the rivet head will generally taper from the raised area 30 to the periphery 28. In the preferred embodiment, the tapering surface 34 is not a linear or conical taper, but rather is a surface which approximates a shape defined by a portion of a torus which is tangent at the periphery 28 of the first section 22 to a plane perpendicular to the rivet axis, and which portion of the torus curves therefrom to intercept the periphery of region 30. This is illustrated in FIG. 1 wherein the center of the generating radius R for the curve of the cross section is spaced outward from the axis of the rivet by an amount equal to the radius of the first section 22 of the rivet. As shall be subsequently explained in greater detail, when the rivet is set, the raised area 30 is flattened, the material thereof being pushed downward generally into the first section 22 of the head, expanding the same radially substantially more than the clearance between the first section and the first counterbore, thereby providing a strong interference fit therebetween to create a strong fuel seal. In the preferred embodiment the area of the central raised region 30 is approximately 70% of the cross sectional area of the shank 20 of the rivet. This amounts to a diameter for the central raised area of approximately 84% of the shank diameter.

The importance of the parameters defining the head endface of the rivet are perhaps best illustrated by considering cross sections of the rivet in an unset state, a partially set state and in the fully set state in counterbores of various depths. Thus referring now to FIG. 2, a cross section of a rivet in accordance with FIG. 1 in a counterbored hole in a workpiece of proper depth and width and with anvil 44 of a setting tool in contact with the central region 30 of the rivet head may be seen. In general, rivet setting tools have an anvil such as anvil 44 which contacts the head end of the rivet, an opposite anvil (not shown) for contacting the shank end of the rivet and a spring-loaded member concentric to the last named anvil and pressing against the bottom of the workpiece. In this manner the force on the head end of the rivet during setting will be equal to the setting force on the shank end of the rivet plus the force of the spring-loaded member acting on the underside of the workpiece, so long as the anvil 44 does not itself contact the top surface of the workpiece. The net result is that there is a net force on the rivet itself forcing the rivet into the counterbored hole in the workpiece during setting which is equal to the force of the spring-loaded member against the underside of the workpiece, though this spring-force is normally only a small percentage of the required setting force for the rivet.

Figure 2:
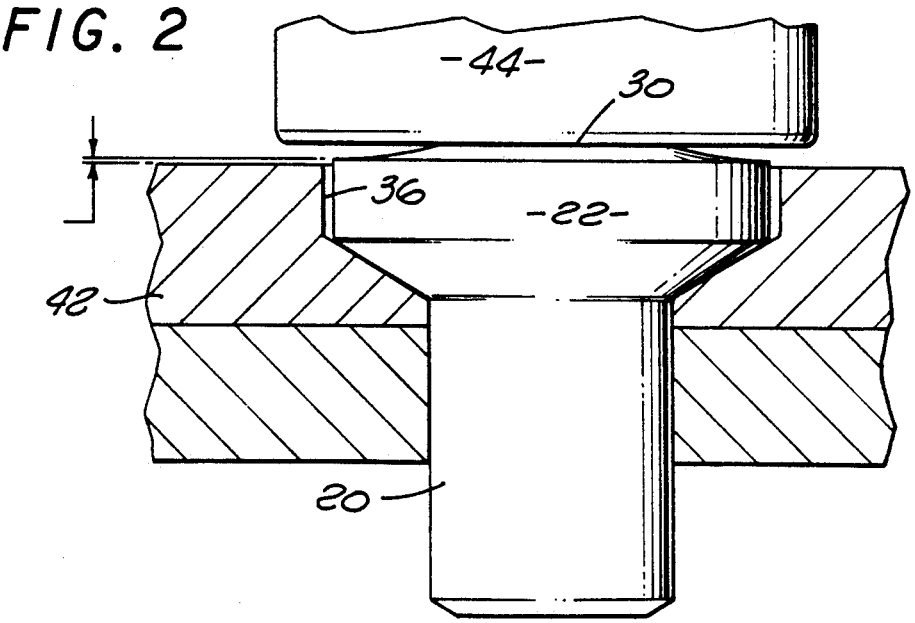
FIG. 2 is a partial cross section similar to that of FIG. 1 showing a setting anvil positioned to engage the flat surface on the head end of the rivet.
Figure 3:
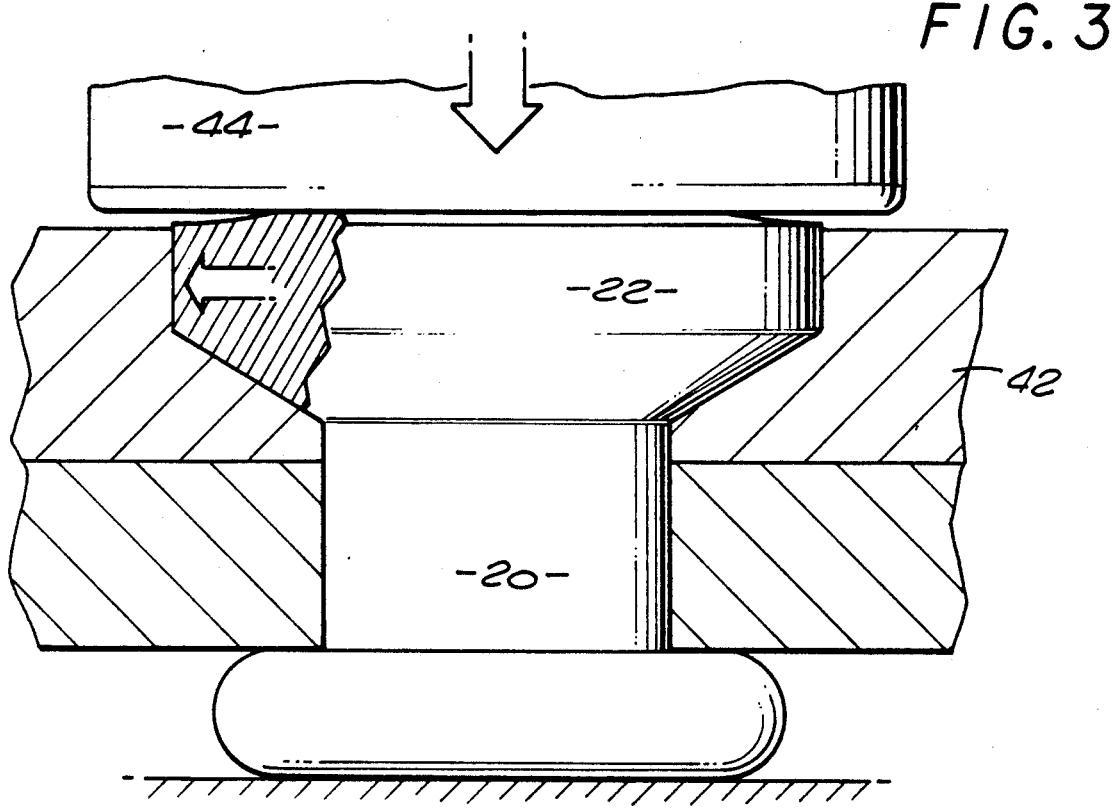
FIG. 3 is a cross section similar to FIG. 2 illustrating the rivet after the same has been partially set.
Figure 4:
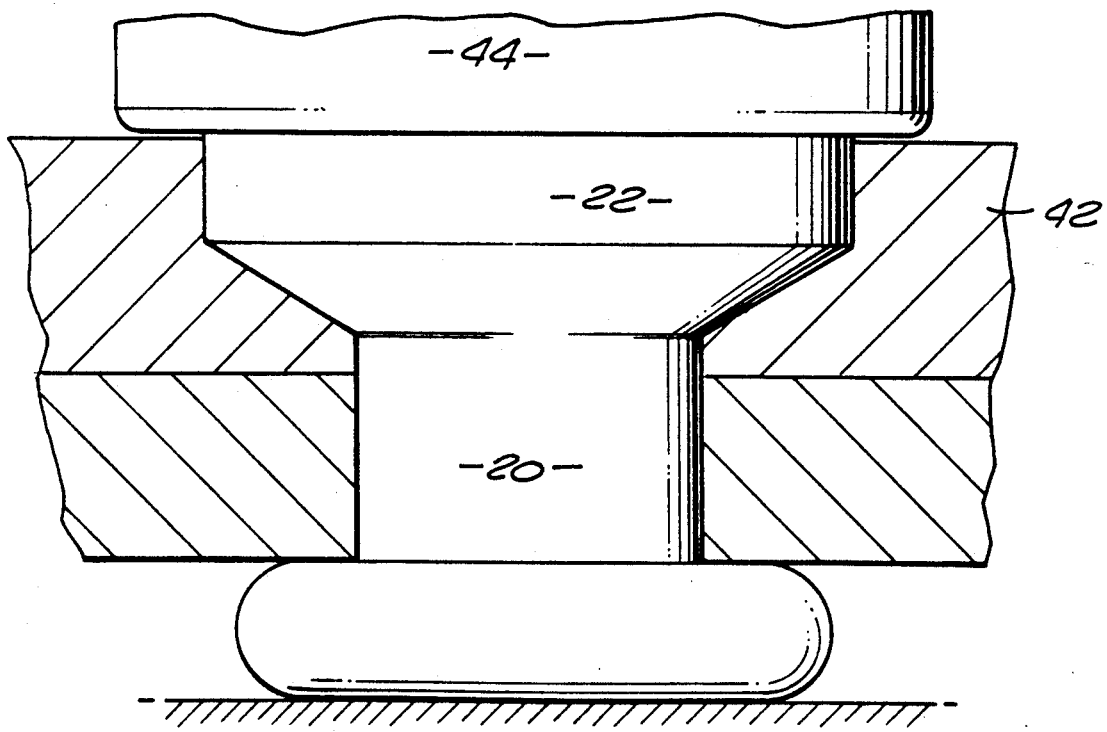
FIG. 4 is a cross section similar to FIGS. 2 and 3 showing the rivet in the fully set condition.

Now referring to FIG. 3, as the force between the two anvils is increased to initiate setting of the rivet, the first portion of the rivet to yield in compression is the upward extending area 30 in the head end of the rivet into the first cylindrical section 22 of the rivet, forcing the same to expand radially to fill the initial gap between the central section 22 and the first counterbore 36 and to begin a forceful tight fit therein, the raised central section 30 and the associated part of the head thereunder being the first region to yield because of the same having a cross sectional area which is less than the cross sectional area of the rivet shank. As this yielding in compression continues however, the area of the head end of the rivet in contact with the anvil 44 increases, so that once the area of the head in contact with anvil 44 approximates the cross sectional area of the shank 20 of the rivet, the upset at the lower end of the rivet begins. This intermediate setting condition is illustrated in FIG. 3. As setting continues, the flattening and expansion of the head end of the rivet continues until setting is complete, as illustrated in FIG. 4. When this stage is reached either the entire head or substantially the entire head has been flattened and the further advance of anvil 44 stopped because of such flattening. In this condition the anvil has either just barely reached the top surface of the workpiece or is still spaced somewhat therefrom by an amount which as previously stated typically will range from 0 to 0.004 inches. Such an installation as is illustrated in FIGS. 2 through 4 is the ideal installation, both the rivet and the hole being dimensioned so that as long as both are within tolerance the head will be expanded to provide a very tight fuel seal, the conical portion of the head will be in firm engagement with the conical portion of the counterbore and the height of the rivet head above the workpiece will range from flush to typically on the order of 0.004 inches, thereby not requiring any after installation shaving in aerodynamic applications.

Figure 5:
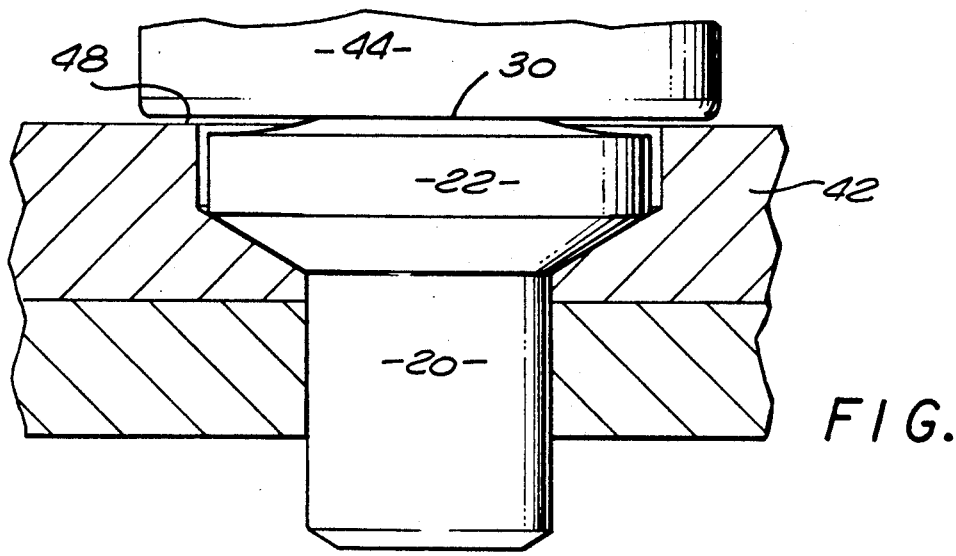
FIG. 5 is a cross section similar to FIG. 2 showing the rivet positioned in a slightly deep counterbore prior to setting.
Figure 6:
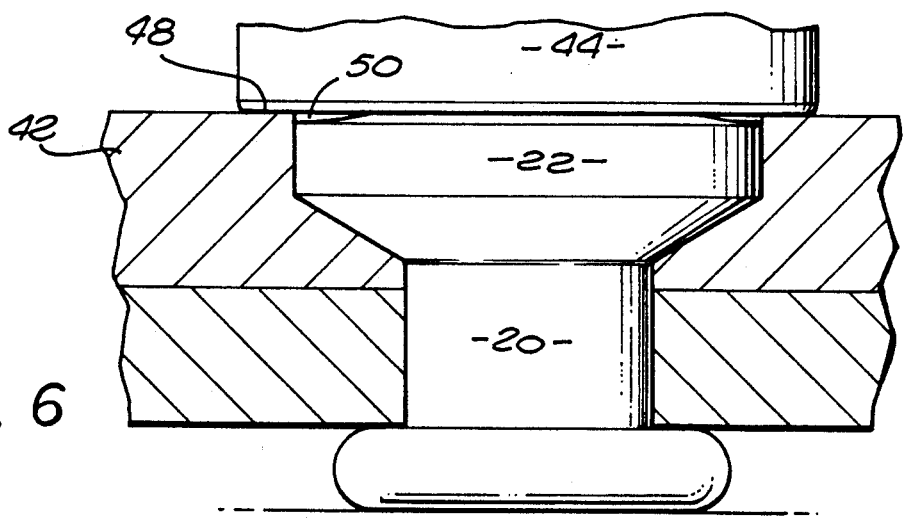
FIG. 6 is a cross section similar to FIG. 5 showing the rivet in the slightly deep counterbore after setting.

Now referring to FIG. 5, a diagram showing a rivet in accordance to the present invention in a slightly deep counterbore prior to setting may be seen. The phrase "slightly deep" means that the counterbore is somewhat deeper than the maximum allowed by design as indicated by the fact that the periphery of the endface 28 before setting is lower than the top surface of the workpiece 42. In this case, when the rivet is set as shown in FIG. 6, the raised central section 30 of the rivet will still flatten sufficiently so as to radially expand the cylindrical section 22 of the rivet to provide a fuel tight seal between the head and the counterbore, the flattened head having an area in contact with anvil 44 as large as or still slightly larger than the cross sectional area of the shank 20 of the rivet so that the tapered portion of the rivet will be kept in firm engagement with the conical counterbore. The condition can be inspected after setting of the rivet however, by inspecting for the characteristic positioning of the peripheral area 50 below the surface 48 of the workpiece, and limits may readily be set either for the maximum depth of the surface 50 below the workpiece surface and/or the radial extent of the annular area 50 within which flattening during setting of the rivet has not occurred.

Figure 7:
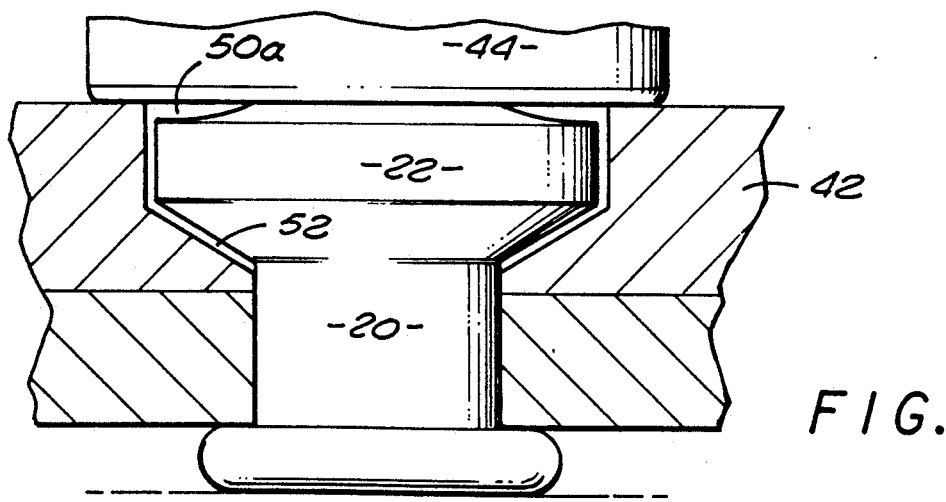
FIG. 7 is a cross section similar to FIGS. 4 and 6 though showing the rivet in a very deep counterbore after the same has been set.

If on the other hand the counterbore in the workpiece is somewhat deeper yet, there will still be a flattening of the head end of the rivet so that an area approximately equal to the cross sectional area of the shank results, though if the counterbore is sufficiently deep for the anvil 44 to bottom against the surface 48 of the workpiece before that limited flattening occurs, the force from the anvil on the other end of the rivet will cause the rivet to move upward as the head flattens, creating a void in region 52 just under the head. Also some radial expansion of region 22 of the rivet head will occur, though that radial expansion will be limited, not providing as tight a seal as desired. Further, the expansion tends to be concentrated near the top of section 22 of the rivet, primarily because the lower part thereof was not really confined during the setting procedure. Such a condition, readily indicated by inspection after setting of the rivet by the size and radial extent of region 50a, is indicative of a riveted joint which will have a reduced strength and a substantially reduced fatigue life before leaking because of the grossly reduced resistance of the joint parts to move relative to each other under the effects of repetitive stressing and vibration. Thus the size of region 50 (FIG. 6) and 50a (FIG. 7) and/or the extent to which the periphery of the rivet head is depressed below the surface of the workpiece provides a readily visually perceivable and inspectable condition to determine the quality of the riveted joint after the rivet is set.

The foregoing is to be compared to the prior art rivets, particularly either the ring dome rivets hereinbefore referred to or the centrally domed rivets such as disclosed in U.S. Pat. No. 4,000,680. In both cases the area of the head of the rivet in contact with the setting anvil generally remains smaller than the cross sectional area of the shank so that the head of the rivet during setting tends to be nearly fully flattened before the shank end is substantially formed. In the case of a deep counterbore in the workpiece wherein the setting anvil at the top of the rivet head bottoms on the workpiece before the head is fully flattened and expanded, the remaining flattening of the rivet head occurs by way of the lower anvil forcing the entire rivet upward, again creating a void under the rivet head equivalent to the void 52 of FIG. 7. Because of the design of these heads, the same will still pretty much entirely flatten, creating the visual appearance of a very good installation, yet providing either a weak or nonexistent fuel seal and being susceptible to developing premature leaks and even a possible stress or fatigue failure. It is the inspectability of the present invention after setting which primarily distinguishes the same from other expanding head rivets for fuel sealing applications, particularly such prior art rivets as are intended to be used in aerodynamic as well as other applications without requiring the shaving of a head or at least selective shaving of the rivet heads after installation.

I claim:

1. For combination with a workpiece having a bore, a first counterbore of a first length which is substantially cylindrical, and a second counterbore which is frustroconical and tapers forwardly between the first counterbore and the bore:
   (a) a rivet having an axially extending shank receivable in the bore and defining an axis;
   (b) the rivet having a head including an endface, a first section located forwardly of the endface, and a second and forwardly tapered section located forwardly of the first section;
   (c) the first section having a periphery with an undeformed length which is about the same as but not less than the length of the first counterbore in the workpiece;
   (d) the first section having an undeformed outer surface of a diameter which is less than but about the same as the diameter of the first counterbore so that the first section is radially outwardly deformable into tight peripheral engagement with the first counterbore;
   (e) said head endface having a raised central section having a substantially flat surface perpendicular to the axis of the rivet, the ratio between the area of said raised central section and the cross sectional area of said shank being constant for all rivet sizes and types, the ratio being approximately 70%, said head endface tapering from said raised central section to the periphery of said first section.

2. The rivet of claim 1 wherein said first section has a periphery with an undeformed length ranging from the same as to 0.004 inches more than the length of the first counterbore in the workpiece.

3. The rivet of claims 1 or 2 wherein the taper from said raised central section to the periphery of said first section approximates a shape defined by a portion of a torus which is tangent at the periphery of said first section to a plane perpendicular to the rivet axis and which curves away therefrom to intercept said substantially flat surface of said raised central section at the periphery thereof.

4. In combination with a workpiece having a bore, a first counterbore of a first length which is substantially cylindrical, and a second counterbore which is frustroconical and tapers forwardly between the first counterbore and the bore:
   (a) a rivet having an axially extending shank receivable in the bore and defining an axis;
   (b) the rivet having a head including an endface, a first section located forwardly of the endface, and a second and forwardly tapered section located forwardly of the first section;
   (c) the second and forwardly tapered section of the rivet substantially conforming to said second counterbore in the workpiece;
   (d) the first section of the rivet having a periphery with an undeformed length which is about the same as but not less than the length of the first counterbore in the workpiece;
   (e) the first section of the rivet having an undeformed outer surface of a diameter which is less than but about the same as the diameter of the first counterbore so that the first section is radially outwardly deformable into tight peripheral engagement with the first counterbore;
   (f) said head endface having a raised central section having a substantially flat surface perpendicular to the axis of the rivet, the ratio between the area of said raised central section and the cross sectional area of said shank being constant for all rivet sizes and types, the ratio being approximately 70%, said head endface tapering from said raised central section to the periphery of said first section.

5. The combination of claim 4 wherein said first section has a periphery with an undeformed length ranging from the same as to 0.004 inches more than the length of the first counterbore in the workpiece.

6. The rivet of claims 4 or 5 wherein the taper from said raised central section to the periphery of said first section approximates a shape defined by a portion of a torus which is tangent at the periphery of said first section to a plane perpendicular to the rivet axis and which curves away therefrom to intercept said substantially flat surface of said raised central section at the periphery thereof.

7. In combination with a workpiece having a bore, a first counterbore of a first length which is substantially cylindrical, and a second counterbore which is frustro-conical and tapers forwardly between the first counterbore and the bore, the length of said first counterbore having a minimum and a maximum tolerance range;

in the undeformed state:
- (a) the rivet having an axially extending shank receivable in the bore and defining an axis;
- (b) the rivet having a head including an endface, a first section located forwardly of the endface, and a second and forwardly tapered section located forwardly of the first section;
- (c) the second and forwardly tapered section of the rivet substantially conforming to said second counterbore in the workpiece;
- (d) the first section of the rivet having a periphery with an undeformed length which is not less than the maximum tolerance length of the first counterbore in the workpiece;
- (e) the first section of the rivet having an undeformed outer surface of a diameter which is less than but about the same as the diameter of the first counterbore so that the first section is radially outwardly deformable into tight peripheral engagement with the first counterbore;
- (f) said head endface of the rivet having a raised central section having a substantially flat surface perpendicular to the axis of the rivet, the ratio between the area of said raised central section and the cross sectional area of said shank being constant for all rivet sizes and types, the ratio being approximately 70%, said head endface tapering from said raised central section to the periphery of said first section;

said rivet head being seated against the workpiece second counterbore and the rivet set, whereby if the length of the first counterbore is no more than the maximum tolerance, the periphery of the first section of the rivet head at the endface thereof will be flush or above but not within the first counterbore and first section of the head of the rivet radially expanded to tightly fit within the first counterbore, and if the length of the first counterbore is more than the maximum tolerance length of the first section of the rivet head, the periphery of the first section of the rivet head at the endface thereof will be disposed within the first counterbore.

8. The combination of claim 7 wherein before setting, said first section has a periphery with an undeformed length ranging from the same as to 0.004 inches more than the length of the first counterbore in the workpiece.

9. The rivet of claims 7 or 8 wherein before setting, the taper from said raised central section to the periphery of said first section approximates a shape defined by a portion of a torus which is tangent at the periphery of said first section to a plane perpendicular to the rivet axis and which curves outward to intercept said substantially flat surface of said raised central section.

* * * * *